United States Patent
Oxley

(12) 
(10) Patent No.: US 6,185,920 B1
(45) Date of Patent: Feb. 13, 2001

(54) ZERO RADIUS STEERING, COMPACT STAND-ON MOWER AND UTILITY TRACTOR

(75) Inventor: Lonnie Oxley, Versailles, KY (US)

(73) Assignee: Lonmore L.C., Means, KY (US)

( * ) Notice: Under 35 U.S.C. 154(b), the term of this patent shall be extended for 0 days.

(21) Appl. No.: 09/363,987

(22) Filed: Jul. 15, 1999

Related U.S. Application Data

(60) Provisional application No. 60/115,437, filed on Jan. 7, 1999, and provisional application No. 60/093,420, filed on Jul. 20, 1998.

(51) Int. Cl.[7] ................................................. A01D 34/66
(52) U.S. Cl. .......................................................... 56/14.7
(58) Field of Search .................................... 56/14.7, 17.2, 56/17.1, 15.4, DIG. 14; 280/164.1, 91, 99, 112.2; 180/24.01, 256, 124.103, 400, 409, 900; 362/52

(56) References Cited

U.S. PATENT DOCUMENTS

| | | | |
|---|---|---|---|
| 3,396,518 | * 8/1968 | Johnson | 56/24.5 |
| 4,442,477 | * 4/1984 | Hennessey | 362/52 |
| 4,450,673 | * 5/1984 | Hutchison | 56/17.5 |
| 4,977,733 | * 12/1990 | Samejima et al. | 56/14.7 |
| 5,042,242 | * 8/1991 | Evans | 56/255 |
| 5,174,595 | * 12/1992 | Snipes | 280/91 |
| 5,305,844 | * 4/1994 | Ducote | 180/24.01 |
| 5,483,787 | * 1/1996 | Berrios | 56/10.1 |
| 5,483,790 | * 1/1996 | Kuhn et al. | 56/17.5 |
| 5,507,138 | * 4/1996 | Wright et al. | 56/14.7 |
| 5,570,570 | * 11/1996 | Klas et al. | 56/17.1 |
| 5,600,944 | * 2/1997 | Wright et al. | 56/14.7 |
| 5,667,032 | * 9/1997 | Kamlukin | 180/256 |

* cited by examiner

*Primary Examiner*—Robert E. Pezzuto
(74) *Attorney, Agent, or Firm*—Intellprop L.C.; Jack E. Toliver, Esq

(57) ABSTRACT

A self-propelled utility tractor having articulated steering, a standing operator, a turning radius near the rear wheel on the inside of a full turn, the radius of turn being not substantially longer than the wheel base, independent rear wheel brakes to assist in tight turns, a steering wheel for operating a steering linkage, an engine and transmission, centrally mounted with the engine below the transmission transmitting power by a jack shaft so the out put shaft of the engine extends down to power an attachment. Where the attachment is a mower deck, a rear discharge chute on the tractor deflects the clippings uniformly across the rear to avoid wind rowing. Flexible elements rotate above the mower blade to provide additional mulching and turbulent air flow and self-cleaning of the underside of the deck.

9 Claims, 11 Drawing Sheets

ZERO RADIUS STEERING, COMPACT STAND-ON MOWER AND UTILITY TRACTOR

PRIOR PATENT APPLICATIONS

The present disclosure is, in part, based on my earlier patent application Ser. No. 07/679,567, filed Apr. 2, 1991, entitled "Low Inertia Self-Cleaning Mulching Rotary Mower", now abandoned, and on a Provision Patent Application No. 60/093,420 filed Jul. 20, 1998 entitled "Stand-On Mower Utility Tractor with Multi-Purpose Attachments, and on a second Provisional Patent Application No. 60/115,437, filed Jan. 7, 1999, entitled "Compact Stand-On Mower and Utility tractor with Multi-Purpose Attachments" assigned to the Assignee as the present invention, incorporated herein by reference as if set forth in full.

FIELD OF THE INVENTION

This invention pertains to small, low horsepower utility tractors, with articulated steering, on which an operator stands or sits near the radius of turn to reduce the tendency of having to lean into sharp turns for better control of the tractor.

BACKGROUND OF THE INVENTION

Typically, commercial lawnmowers are capable of traveling over the ground at relatively high speeds of between five and six miles per hour, are relatively stable on slopes and unpaved surfaces, and are able to move up close to objects such as trees and shrubs with sufficient control to avoid damaging the plants, and are able to extend the mower deck under fences and shrubs where ground clearances are restricted. Usually the operator will be seated or standing near the turning center of the mower so as to minimize the centrifugal force he experiences in a tight turn, which not only reduces his ability to control the mower, but also adds to his fatigue during long periods of operation.

A mower of this type is disclosed in U.S. Pat. No. 5,507,138, issued Apr. 16, 1996, entitled "Power Mower with Riding Platform for Supporting Standing Operator."

High maneuverability is an essential characteristic of commercial landscaping mowers of this type. It is achieved by combining the propulsion and turning functions in driving the wheels. That is, on each side of the machine, independent drive wheels are powered by the engine in either forward or reverse directions. The wheels cannot steer in a conventional manner. Caster wheels are mounted in front of the mower deck allowing the machine to swivel around, turning on an axis between the rear drive wheels. The operator stands or sits at the turning axis to minimize the turning forces on him in tight turns.

A major problem with such mowers is the degree of training and skill required of the operator to efficiently operate the machine. Typically, a pair of hand levers, one on each side of the operator's station, control independent hydrostatic drives powered by the engine. The technique of driving by levers that are pushed or pulled to independently vary the speed and direction of the drive wheels. Is an acquired skill not well within the training and skill of the ordinary person familiar with driving an automobile, where the propulsion and steering are separate functions, and unlikely to be familiar with a system combining the propulsion and steering into one function using separate hand levers.

In addition, such mowers are expensive to maintain. The independent hydrostatic drive systems essentially have duplicate components and controls of non-automotive specifications. When something goes wrong with one of the dual systems, the machine cannot be operated successfully or fixed by automotive type mechanics.

Also, the caster wheels are set out ahead of the mower deck and on spindles that extend above the mower deck limiting the accessibility of the mower under low objects, such as fences, or traveling up close to buildings and trees.

SUMMARY OF THE PRESENT INVENTION

The present invention provides an engine powered, stand-on, compact tractor, which employs a steering wheel in a conventional manner to operate an articulated steering linkage the geometry of which produces the maneuverability for turning in tight quarters of the dual hydrostatic drives without the skill or training required to operate those machines proficiently.

In accordance with the invention, a light-weight compact tractor vehicle has a frame supporting a pair of drive wheels at one end and a pair of steerable wheels at the other end, spaced about as far apart as the vehicle track width, that is the wheel base is about the same as the overall width. A steering wheel operates a steering linkage, the geometry of which is such with the axles, frame and drive wheels, that at full lock of the steering wheel, the steerable wheels are turned the maximum angle defined by having their axes both intersect on or near the end of the drive wheel spindle on the inside of the turn.

The engine and transmission are mounted on the frame forward of the operator near the center of gravity of the vehicle for better stability. The transmission is above the engine. A jack shaft and drive belt pulley system connects the output of the engine drive shaft to the input shaft of the transmission. A clutch and brake pedal combined controls a cable and pulley system for operating the clutch at the same time as releasing the parking brake. In the preferred embodiment, the transmission is a hydrostatic trans-axle with a swash plate controlled by a hand lever for forward or reverse and variable speed delivered through a differential gearing housed in the transmission. Opposed axles, or output shafts, carry sprockets for driving a chain traveling down to sprockets on each drive wheel. An axle bar supports fixed wheel spindles on opposite sides of the frame rotatably mounting the drive wheels. Independent braking of the drive wheels enhances the steering that is in either a right or left full turn, the inside wheel may be braked simultaneously to achieve a tighter turning radius.

The steering linkage has a double acting actuator that is moved by the steering wheel transversely relative to the frame, right or left, imparting a rectilinear motion at either end which is translated into angular motion of the steerable wheels. Axle bars, which are allowed to rock up and down on a pivot to the frame for oscillations over uneven terrain, support spindles shafts on which the wheels are mounted. A pair of links connect the opposite ends of the actuator to spindle arms fixed to the spindle shafts for turning them either the right or left from a straight-ahead position. The length of the spindle arms in relation to the length of the links connecting them to the actuator, and the spacing of the link pivotal connection to the actuator and the pivotal mounting of the spindle shafts, which are closely adjacent and in front of the axle bars, is part of the geometry whereby the spindle shaft of each steered wheel, when in a full lock, right or left position, points toward the drive wheel on the inside of the turn so their axes intersect near the drive-wheel hub, but a least within a turning zone encompassing a horizontal rectangle of about 25% of the wheel base length in the longitudinal direction and 20% of it in the lateral direction, the mid-point of the turning zone thus being essentially the rear axle centerline.

The importance of this steering linkage geometry during full turns is to minimize tire scuffing, reducing tire life, but also the steered wheels lose some of their traction in turning if they are required to track outside the optimum turning radius.

Conventional steering geometry cannot achieve these objects because the tighter the turn radius, the worse the tire scuffing becomes due to the poor steering geometry.

Further, in the application of the invention as a lawnmower, a mower deck is provided, mounted beneath the frame of the vehicle and extending laterally between the front and rear wheels. Belt-driven blades rotating in the deck are driven in a conventional manner and discharge the grass clippings through a rear-housing projection between the rear wheels. Conventional means are provided for adjusting the height of the deck which floats with respect to the frame for the proper height of cut relative to the ground by means of a manual control accessible from the operator's position.

In accordance with this aspect of the invention. the rear discharge of the mower deck exhausts the grass clippings into a baffle housing, which is part of the tractor chassis, in that it is mounted on the tractor frame and has diverging baffle elements designed to distribute the grass clippings uniformly across the rear of the machine behind the drive tires so as to avoid the wind rowing problem of conventional mulching mowers.

Additionally, a three blade mower deck is provided in which one blade is rotated in a direction opposite to the other blades. Blade chambers have curved baffles discharging the clippings to the baffle housing for better dispersion of the grass clippings. There are three discharge paths defined by the baffles, a left diverging path, a center path and a right diverging path from the deck that are extended rearwardly by the frame's baffle housing, spreading the clippings past the rear axle and behind the right and left rear tires. While the invention will be described with respect to a three-blade mower deck, the concept could be adapted to a two-blade mower where a chassis baffle path is defined for each path, or a single blade deck may be used.

Moreover, the deck discharge openings may be closed off at the side, or rear, and a opening made in the top of the deck for collecting clippings in a bag blown out the top opening rather than being distributed on the ground.

A further improvement to the mulching mower application of the present invention is the low inertia self-cleaning feature. As disclosed in my patent application, Ser. No. 07/679,567, filed Apr. 2, 1991, now abandoned, low mass elements comprising nylon strings or steel wires spin with the mower blade shafts to knock off the wet grass clippings that adhere to the underside of the deck, create an air flow, which helps to prevent build-up and enhances the discharge of the clippings in the baffle design of the present invention. In addition, the string elements enhance the cutting by providing additional cutting of the clippings into a mulched state fine enough for turbulent transportation and distribution by the discharge system of the mower onto the ground, or when bagging the grass clippings the exhaust pressure is enhanced for blowing the clippings into a bag transported by the mower.

In the preferred embodiment of the low inertia string elements, a carrier disc is mounted to the blade shaft, above the blade. It has a diameter that is less than the diameter of the blade. The disc has a mounting location for one or more string elements extending radially on its periphery. The tips of the string elements extend approximately to the tips of the blade. The angular velocity of the rotating blade shafts extends the flexible strings more or less perpendicular to the disc. Due to the position of the disc, the strings are extended to within close proximity of the underside of the deck, which is relatively flat and free from obstructions such as bolts or flanges, which could interfere with the movement of the strings and shorten their life. The combination with the rotating cutting blade having a mulching tip for creating air movement, the string elements which have been made rigid by the centrifugal force, and the baffles serves to create a high speed turbulent airflow with the ground effect under the deck keeping the grass clipping suspended for a period of time to pulverize them before discharge into the baffle housing, or to the top opening for bagging when the rear or side discharge are closed off. At the high speed rotation of the blades, the string elements beneficially have a low mass inertia relative to the blades to facilitate quick stopping, and start up, and minimize excessive vibration making it unnecessary to perform balancing operations as the strings wear, or need to be replaces since their masses are negligible in comparison to the other rotating parts of the blade assembly.

The life of the string elements is longer and wear is more even than in conventional string trimmers which have to contact hard objects such as posts and curbs causing high abrasion. Also, durable filaments of wire or other stiff-type rigid axial elements of relatively light weight may be used because the string elements are protected by the mower deck and cannot damage objects which are being mowed around such as trees or expensive landscaping which might otherwise be damaged by a rigid string element contacting the delicate foliage.

Therefore, according to one of the objects of the invention, a self propelled utility tractor has articulated steering, which may be combined with independent braking of the drive wheels, to produce zero radius steering (ZRS) defined as the ability to turn essentially within the wheelbase length of the tractor with minimum tire scuffing.

Another object is to provide a tractor vehicle capable of maneuvering in tight turns where the operator stands, or has a position on the machine, near the turning radius so as to minimize the necessity of leaning into a turn and provide better control of the machine.

Another object of the invention is to uniformly distribute the gross vehicle weight, with the operator toward the rear, so the center of gravity of the tractor is near the center of the frame of the vehicle when used as a mower, but if it is used with other attachment mounted on the front, such as a hydraulically extendible mast for lifting objects in the manner of a bucket loader, rotary snow blower or other attachment, the operator's weight at the rear serves as a partial counter-weight.

Another object is to provide a compact tractor drive system where the transmission is mounted above the engine and is powered by a jack shaft, with the engine output extending down so it can directly power a mower deck, or other attachment, such as described herein. The drive wheels are powered by differential gearing from the transmission enabling one wheel to be braked while the other continues under power in either forward or reverse direction.

Another object is to provide an articulated steering linkage for a compact tractor vehicle achieving full-lock-to-lock positions with a 360 degree revolution of the steering wheel, at which position the axes of the axle spindles of the steered wheels are aimed to intersect in a turning zone defined by a rectangle 20% wide by 25% long of the wheel base length horizontally bisected by a line at or near the turning radius for zero radius steering (ZRS) in tight turns minimizing tire scuffing and wear while achieving better traction of the steered wheels.

Another object is to provide a mulching mower where the chassis supports an underslung mower deck having a rear discharge chute exhausting into a baffle chamber supported on the chassis of the machine, the design of which is to receive the clippings discharged by the mower deck and diverge them in paths uniformly across the back of the machine so as to avoid wind rowing.

Another object in conjunction with the mulching mower is to provide a low inertia string element associated with each rotating mower blade that extends to the tip of the blade near the underside of the deck for keeping it relatively clean while also aiding in the turbulent airflow and providing additional cutting of the grass clippings to a mulched state.

Another object is to provide a mower deck that can exhaust either side or rear, and have those discharges closed when bagging the grass clippings where the flexible string elements increase the turbulent air flow and pressure head under the deck to better force the clippings out while keeping the underside of the deck clean, and this aspect of the invention is applicable to any mower, whether self-propelled or not.

These and other objects of the invention will become more apparent by referring to the following detailed description of a preferred embodiment of the invention.

DETAILED DESCRIPTION OF THE INVENTION

Figure 1:
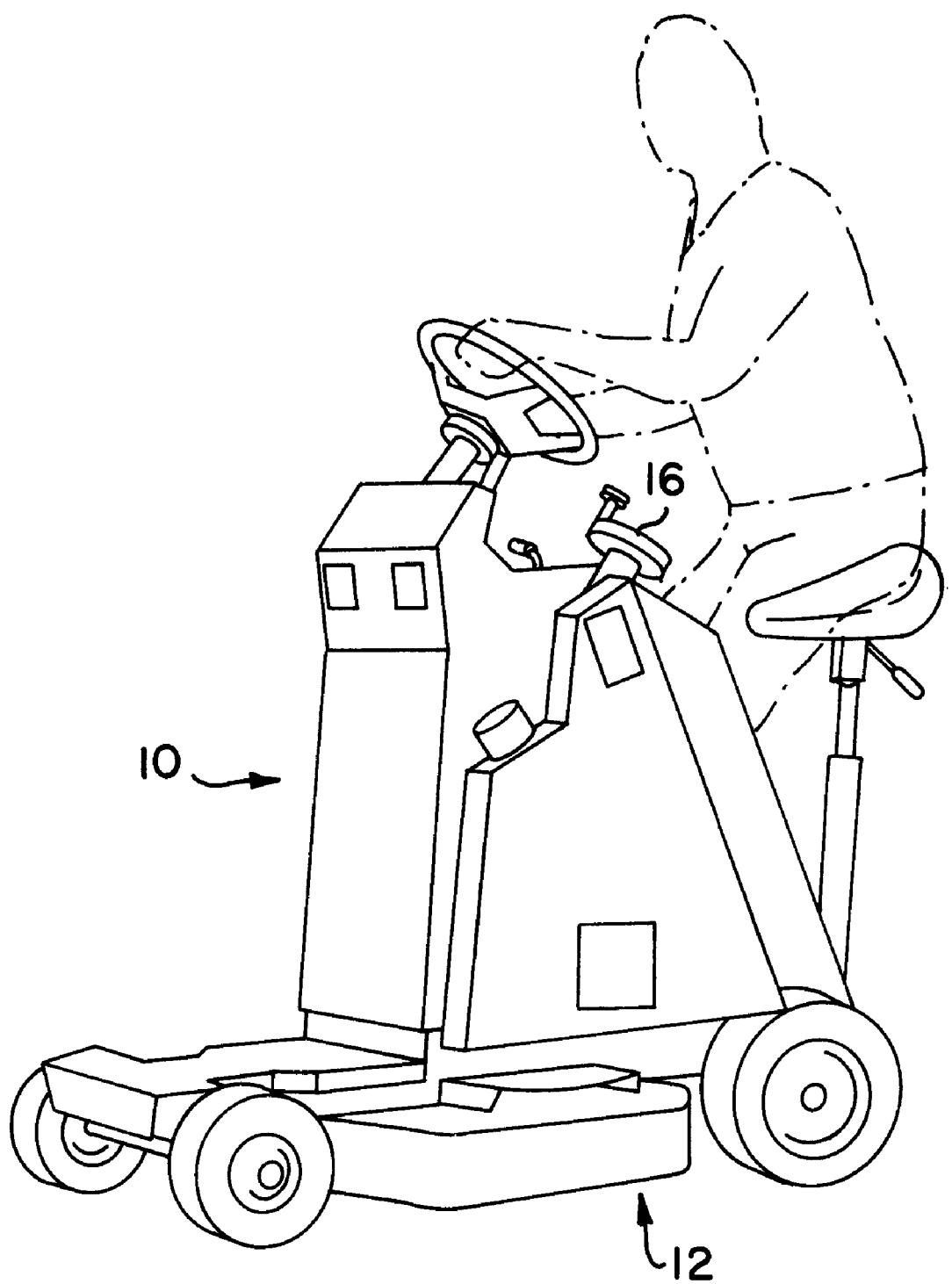
FIG. 1 is a side elevational view of the tractor depicting an operator in the stand-on position, or partially seated, near the rear where the tractor is carrying a mower deck.
Figure 2:
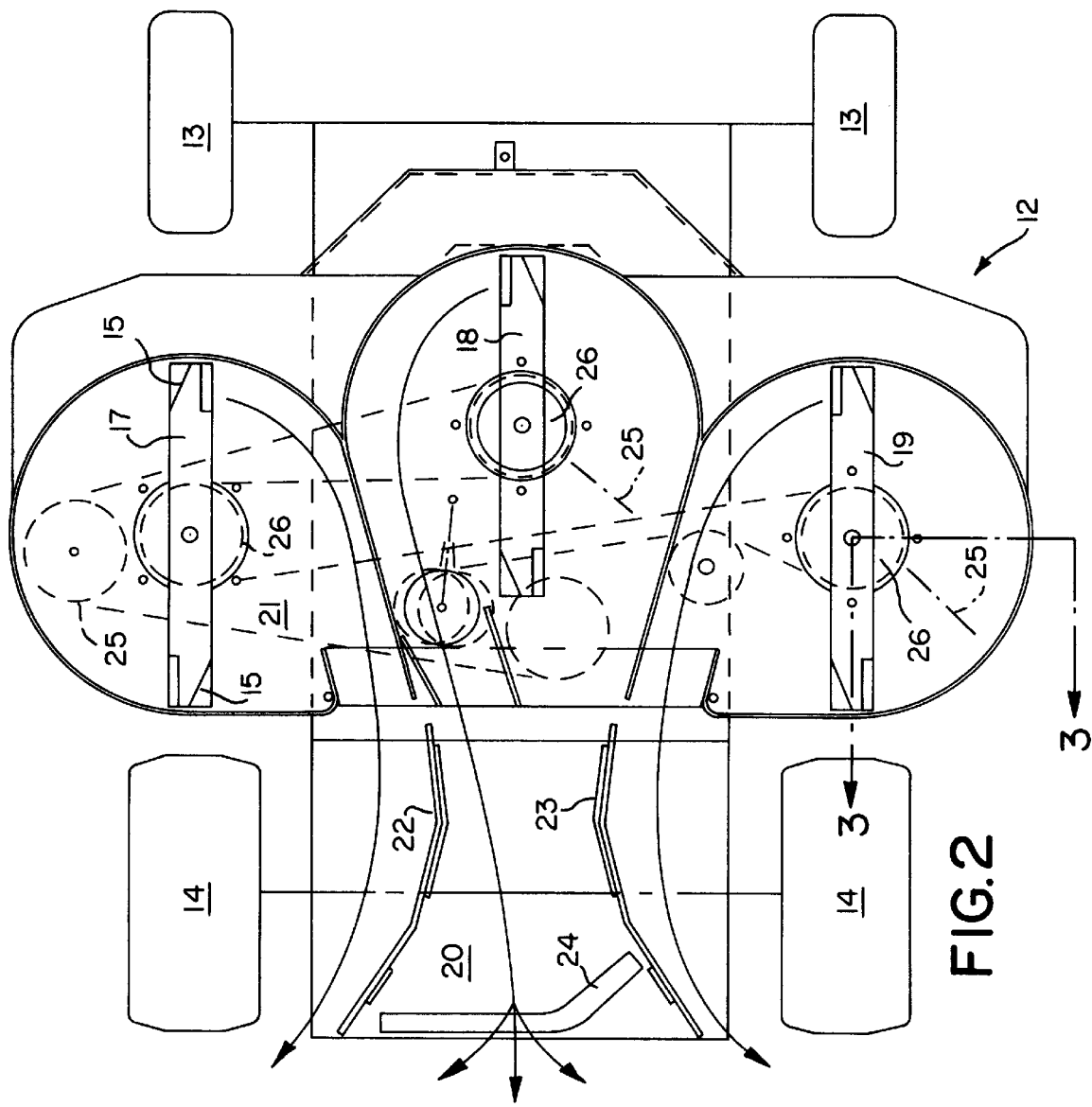
FIG. 2 is a bottom view of the mower deck being carried by the tractor in FIG. 1.
Figure 2A:
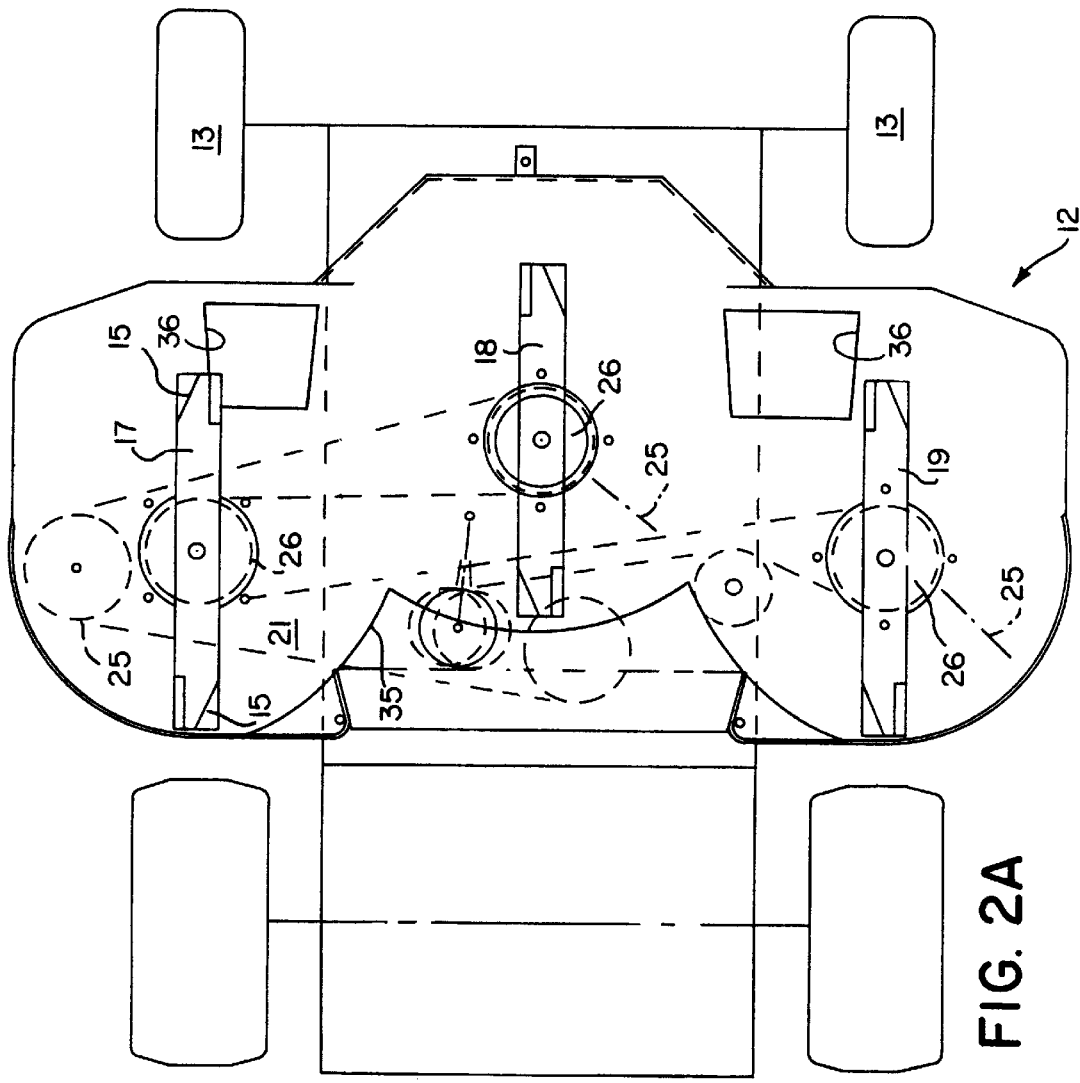
FIG. 2A is a top view of the deck showing the top discharge openings with the rear discharge closed off.

The invention will be described with respect to a mulching mower with low inertia self-cleaning of an underslung mower deck discharging grass clippings out the rear, having a chassis supporting at the rear, a stand-on operator, however, as a tractor vehicle of general utility, it may find wider usage to power other attachments, such as a bucket lifted by a hydraulically powered mast on the front of the chassis, a rotary broom, or snow plow, for example, or where ever there is a need for a highly maneuverable tractor vehicle for powering an attachment in close quarters. The invention also contemplates a mulching mower deck with self-cleaning low inertia filaments of unique configuration. In FIG. 2, the mower deck 12 is supported transversely between the front steered wheels 13 and the rear drive wheels 14. The mower deck 12 is floating under the chassis of the mower in a conventional manner with a control 16 the operator can use to adjust the grass cutting height of the deck. While the tractor could be used with a side-discharge, or single blade, deck, it will be described with respect to a rear-discharged, triple mower deck as depicted in FIG. 2 which features three, side-by-side rotating mower blades 17, 18, 19 mounted on shafts which are driven by a belt and pulley arrangement, generally depicted by dashed lines such that the blade 17 is driven in a clockwise manner discharging from a circular duct chamber formed with the ground to the rear as depicted by the curved arrow while the blades 18, 19 rotate in a counter-clockwise manner and discharge to the rear as depicted by the curving arrows. A baffle housing 20 is mounted on the rear chassis of the machine. The central blade 18 rotates in a counter-clockwise manner and discharges grass clippings through the center chamber of the housing 20, while the blade 19 also rotates in a counter-clockwise manner as depicted by the curved arrow and discharges into a right chamber of the integral chassis baffle housing 20. Baffle plates (22 and 23) curve left and right and central baffle plates 24 deflect the center discharge of clippings down and across the back at the center such that with the three chambers grass clippings are distributed uniformly across the rear and beyond the rear drive wheels 14. For mulching, the blades each have wind tips 15 to create a partial pressure inside the deck for exhausting clippings. In FIG. 2A, the deck is modified to close off the rear discharge by a plate 35 causing the discharge through openings 36 out through the top of the deck where duck pipes (not shown) would transport the clippings to a bag or bin carried on the mower to avoid distributing the clipping if that were desired.

Low inertia string elements 25 are mounted above the blades at their inner ends in a carrier hub, or disc, 26 spinning with the blade shaft. As depicted in the partial sectional view of the mower deck in FIG. 3 the string elements 25, which may be nylon filaments, steel wires or other light-weight flexible linear material, are made rigid by the high angular velocity of the blades. The inner ends of the filaments 25 have a bead 27 which prevents the filaments from being pulled through a rim of the disc 26, which has a hole 28, in which a gromet 29 is inserted to hold and cushion the end of the filaments keeping the centrifugal force from pulling the filament through the aperture 28, as shown in greater detail in FIG. 6. The filaments 25 may also have a bead 27 with a grove 30 and rib 31 cooperating with an aperture 32, which is bent to accommodate the spherical bead 27, as pictured in FIG. 7.

Figure 4:
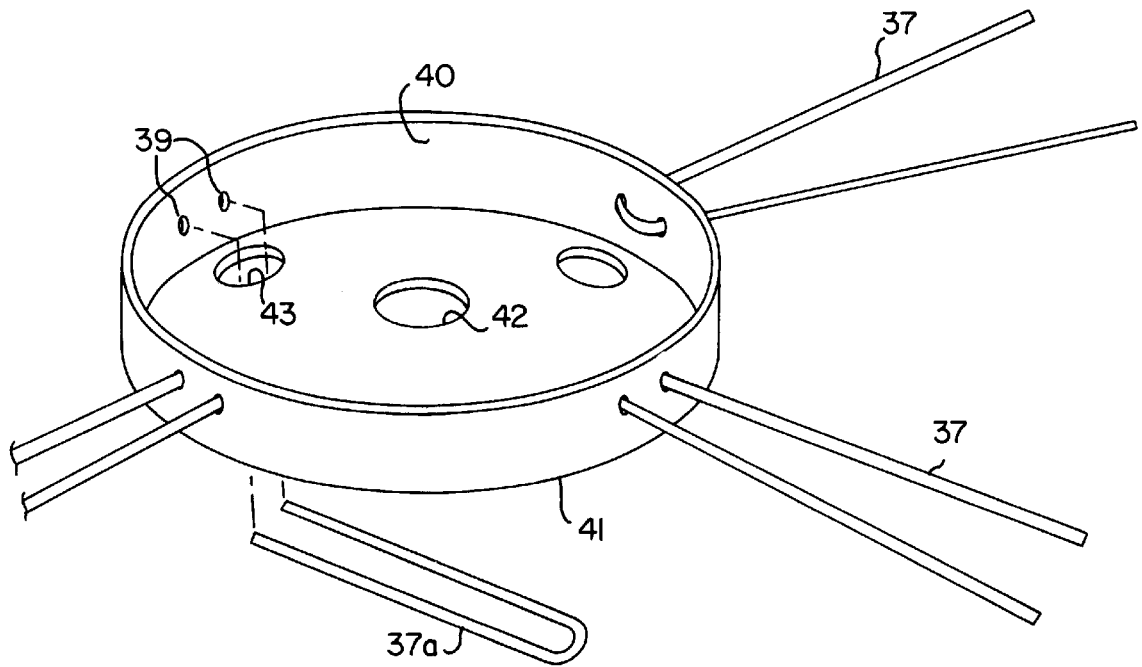
FIG. 4 is a diagram depicting a string element and carrier disc in one form where the elements are U-shaped wires insertible through eyes from the underside of the disc without having to unbolt it from the blade shaft.

Another variation of the low inertia hub and filament disc is shown in FIG. 4. There the string elements 37 are U-shaped wires, the leg portions of which extend through a pair of holes 39 in the rim 40 of a hub 41 in which a center hole 42 is provided for the blade shaft and peripheral openings 43 in the rim are provided for changing elements 37, as depicted in FIG. 4, with a new element 37(*a*). A modification may be to have a conical portion descend with the blade on the outside, bolted at 42, and eliminate access holes 43, so the wires are replaced merely by unbolting the hub.

Figure 5:
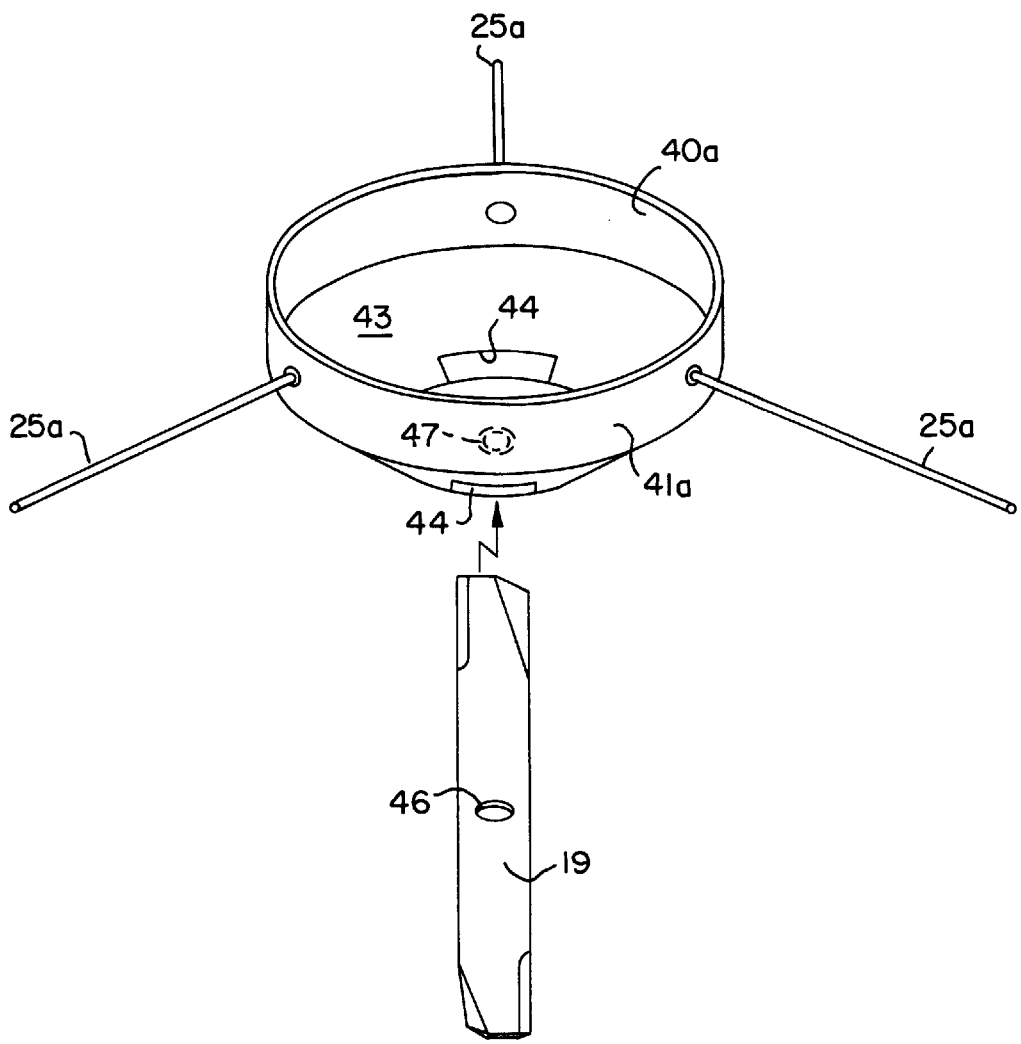
FIG. 5 shows another form of the low inertia disc where a hub portion has a slot on opposite sides through which the cutting blade is passed holding it against relative rotation when bolted to the blade shaft; a variation is also depicted in FIG. 9 of the hub arrangement where the metal has an annular depression around the hole through which the blade shaft passes so that the nut holding the blade on is more secure due to a washer effect when the depression is compressed by the blade nut.
Figures 6, 7:
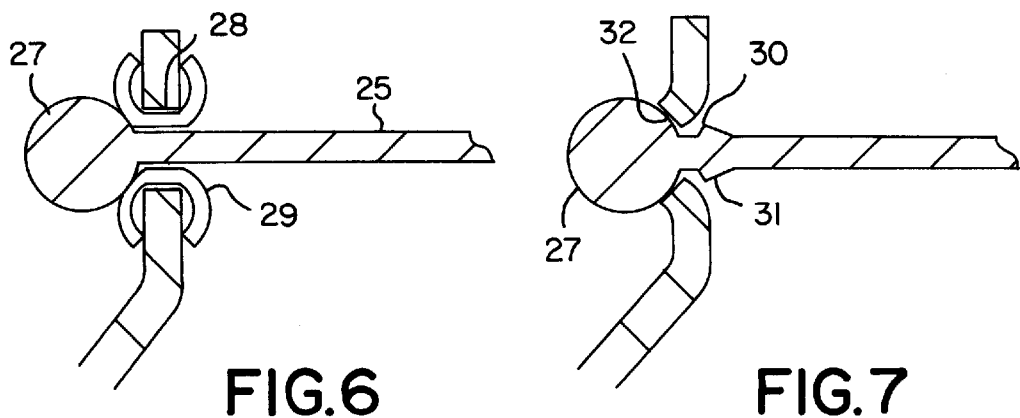
FIG. 6, FIG. 7, and FIG. 8 show variations of the mounting of the string element where a bead holds the string element in a hole, in the case of a flexible chain (FIG. 8), it is attached by a pin and eye arrangement to the periphery of the carrier as pictured in FIG. 9.
Figure 9:
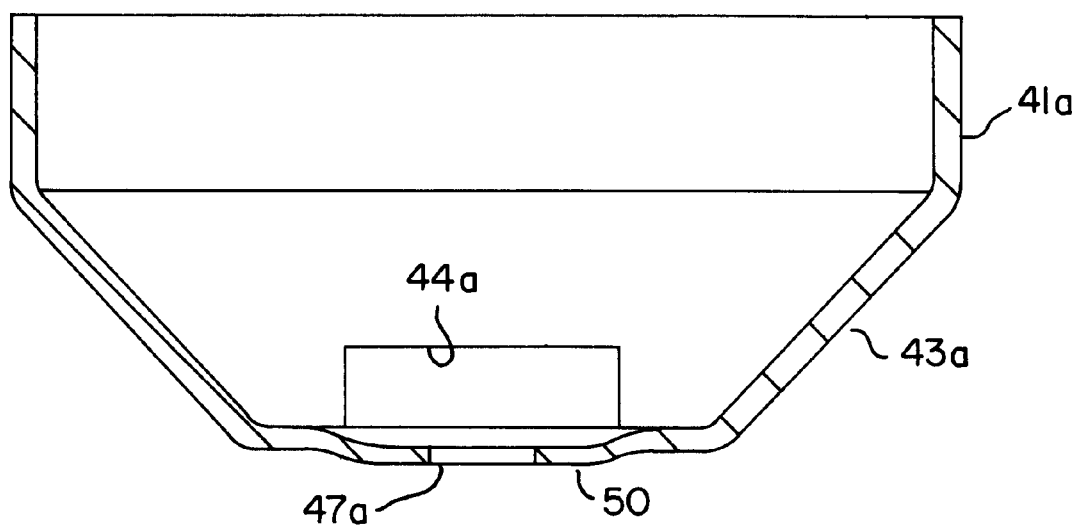

Somewhat similarly, in FIG. 5, a hub 41(*a*) has holes in a rim 40(*a*) in which string elements 25(*a*) are mounted, for example as depicted in FIG. 6 and FIG. 7; however, in this variation the rim 41(*a*) is joined by a conical portion 43 which has side aperatures 44 through which the blade is inserted which locks the blade against relative rotation on the shaft when bolted through the opening 46 of the blade, with the shaft extending through the opening 47 in the bottom of the conical portion 43. As depicted in FIG. 9, the hub 41(*a*) has a conical portion 43(*a*) with a depression 50 around the hole 47(*a*) over which the blade opening 46 is aligned for bolting it to the shaft such that a washer effect is provided by the depression 50 in tightening the nut on the shaft preventing the nut from loosening.

Figure 3:
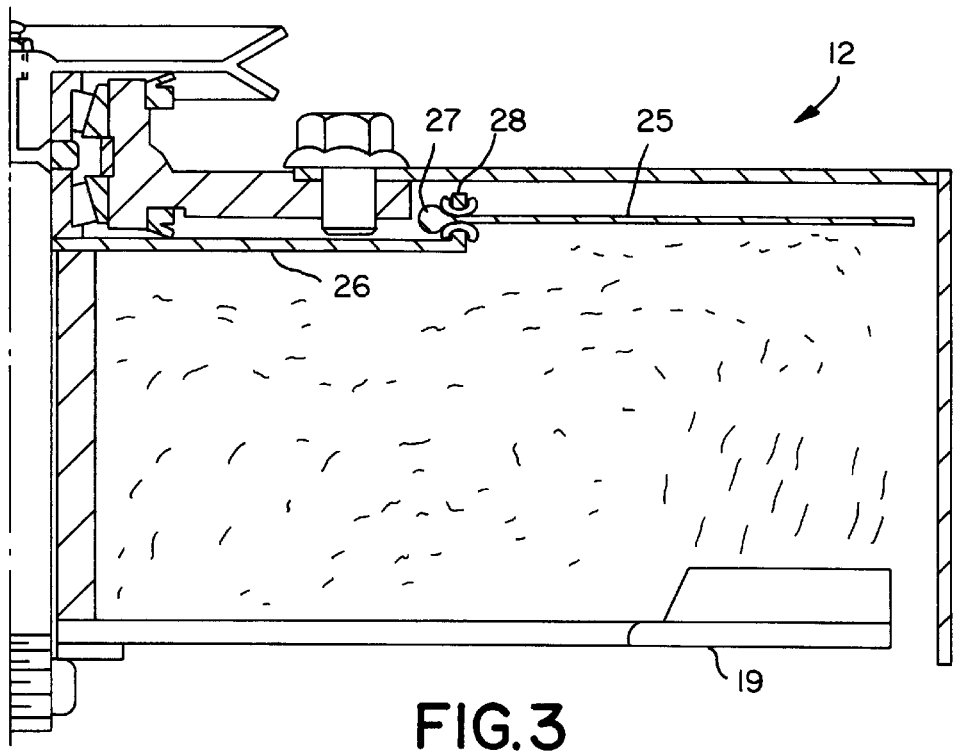
FIG. 3 is a partial cross-sectional view through the mower deck at a blade section taken along line 3—3 of FIG. 2.
Figure 8:
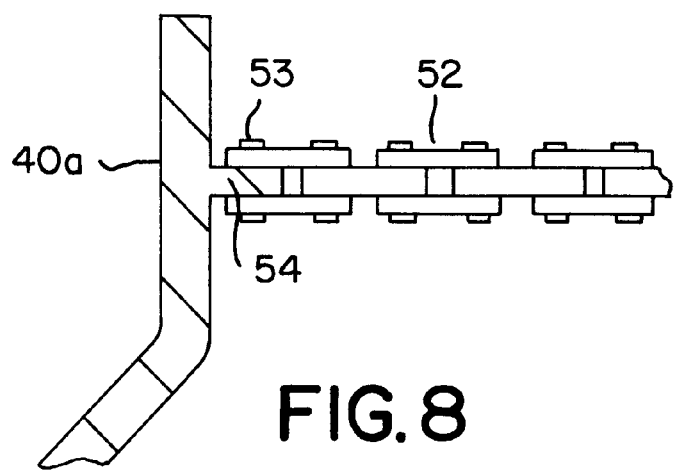
Figure 10:
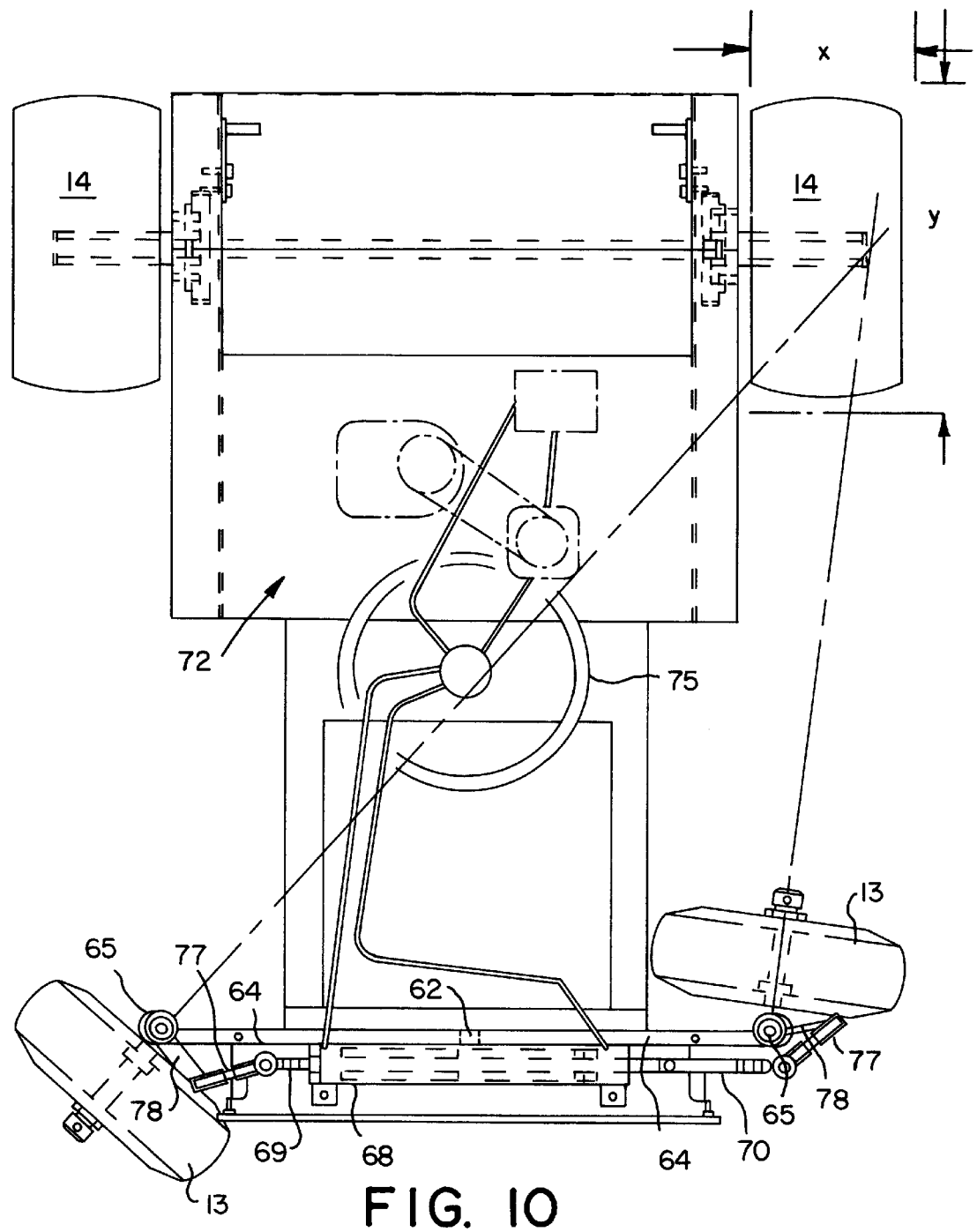
FIG. 10 is a bottom view showing the steering linkage in a full-left turn position.
Figure 11:
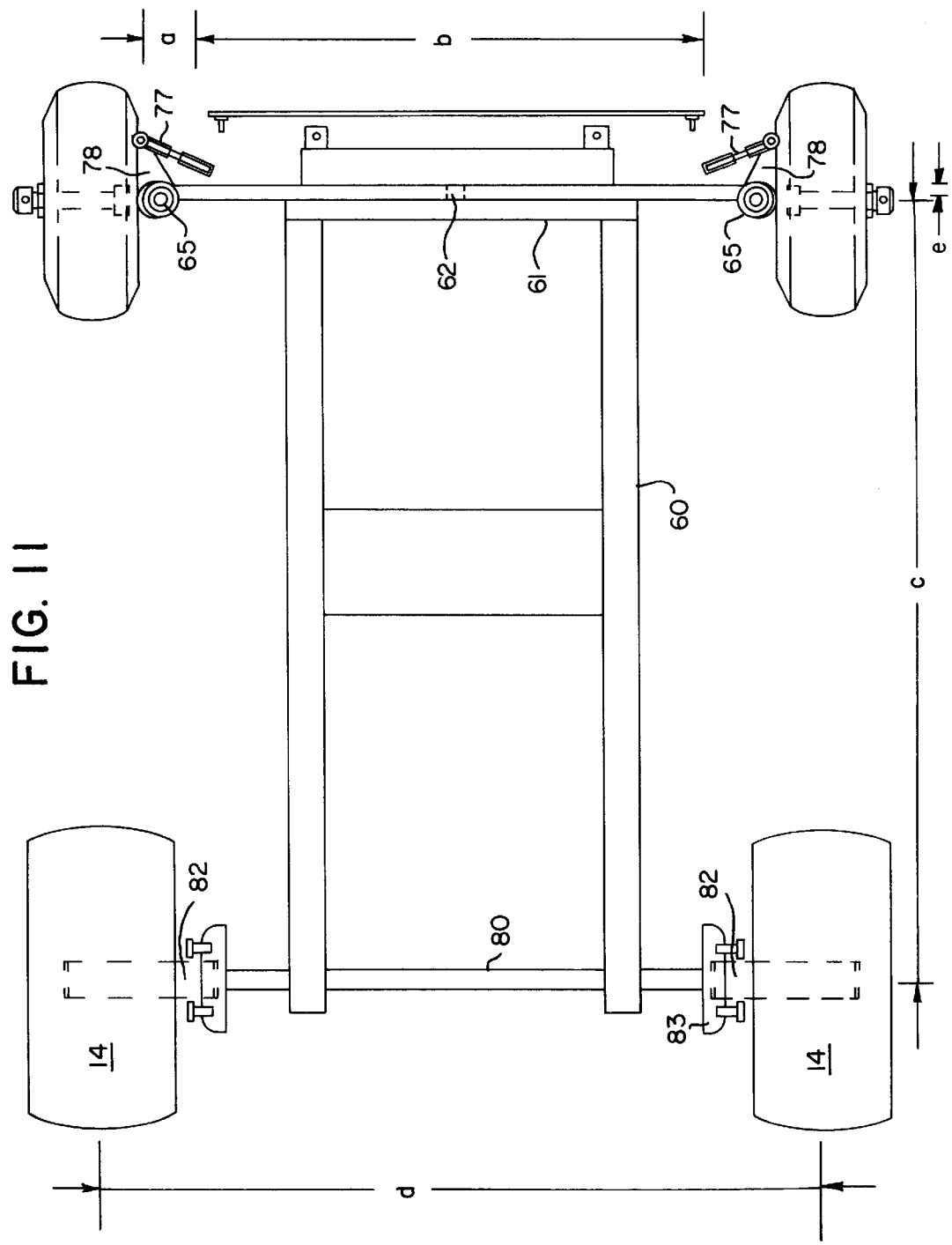
FIG. 11 is a top schematic view of the chassis with the steering linkage position in a straight-ahead mode where the critical angles and dimensions are identified for a preferred embodiment of the invention.
Figure 12:
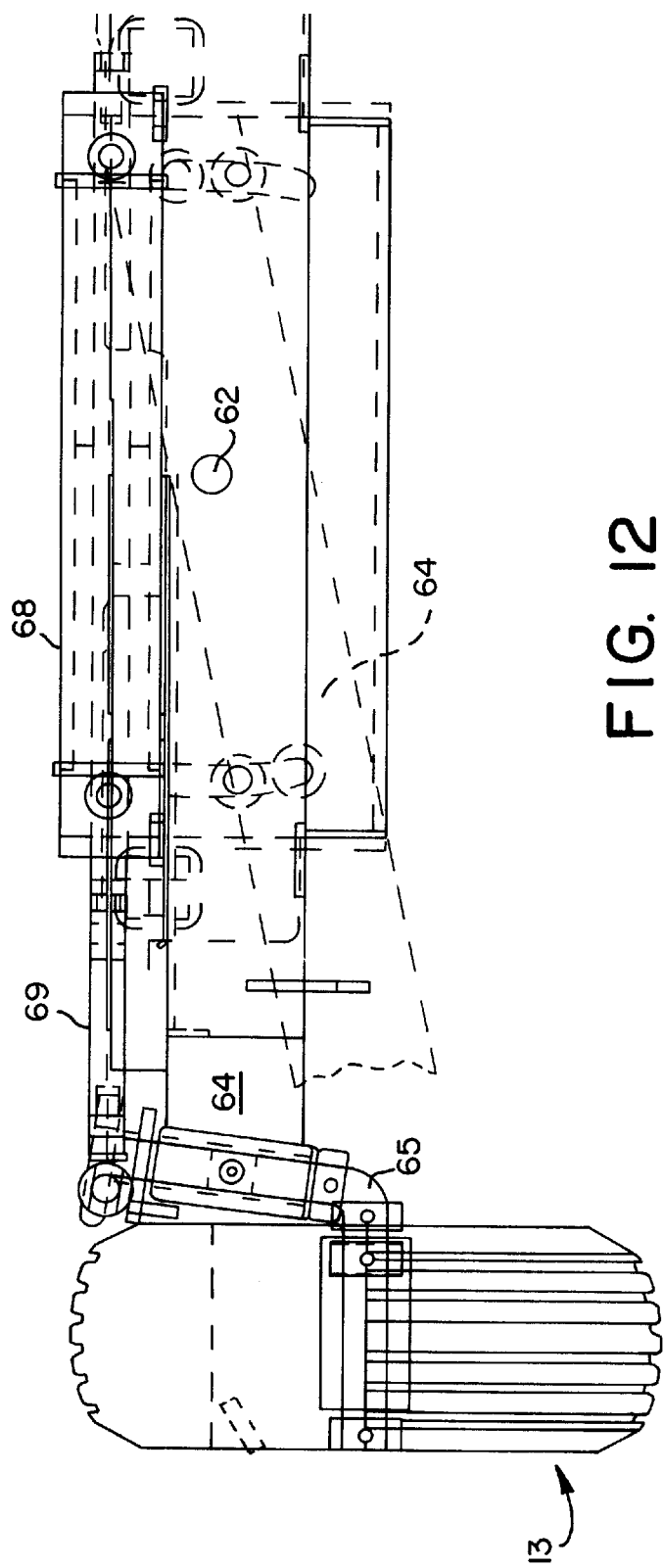
FIG. 12 is a partial front elevation of the front axle and steering assemblies pictured in FIG. 10.

Another variation of the low inertia element is shown in FIG. 8 where instead of the hub 41 or 41(*a*) having mounted in the periphery a plurality of flexible string elements, a link chain 52 may be used which is pinned at 53 to an eye 54 on the periphery of the rim 40(*a*) of the hub. In each of the embodiments, the concept is that the low mass of the rotating elements, whether nylon string, steel wire or links of chain, relatively insignificant compared to the rotating blade so as to avoid the tenancy for unbalancing the system at the high angular velocities employed while cutting grass. The low inertia elements do several things in addition to mulching the grass more finely, as depicted in FIG. 3, they also create a turbulent airflow which helps to prevent a build-up of grass cuttings under the deck and enhance the airflow discharge to the rear, which improves the cutting quality. A turbulent air circulation is created which causes the grass clippings to be re-circulated under the deck and brought into contact numerous times with the violently rotating string elements which are nearly rigid at the high angular velocities employed. These additional cutting surfaces improve the mulching by enhancing the partial pressure differential under the deck and outside ambient pressure so the clippings are exhausted more efficiently, either out the rear, side, or top to be bagged. In addition, the string elements being located close to the underside of the deck keep it relatively clean from wet grass clippings adhering to the underside of the deck. Also, the low inertia of the elements allows smaller braking forces to stop the blades as required by OSHA standards, and lower horsepower consumption in bringing the blades quicker up to mowing speed from a dead stop. Referring to FIG. 10, FIG. 11 and FIG. 12, the frame 60 has a cross-member 61, which pivotly supports at 62 a pair of front axles 64, each of which as shown in FIG. 12 by the dotted line position. oscillate to allow the steered wheels to move up or down so that all four wheels remain in contact with the ground and for stability when traveling over uneven terrain. Each front axle 64 supports a wheel spindle 65 which rotatably mounts a steered wheel 13. Referring to FIG. 10, mounted on the frame transversely in front of the axles 64 is an actuator 68 which in the present preferred embodiment of the invention is a double-acting hydraulic cylinder having cylinder rod ends 69 & 70 which are extended generally parallel to the axles 64 and as close as the dimensions of the cylinder will reasonably permit. A hydraulic steering system 72 of generally conventional design is operated by a steering wheel 75 in a known manner to deliver hydraulic fluid under pressure to either end of the hydraulic cylinder 68 so as to move the double acting cylinder rod in opposite directions, either right or left, depending on the direction the steering wheel is rotated. In FIG. 10 it is shown in the full left turn position, but it will be understood that the steering linkage may be articulated to a straight-ahead or full lock right turn position, or any position in between by a corresponding rotation of the steering wheel 75, in which a 360 degree rotation will produce a full turn. The rectilinear motion of the cylinder rod parallel to the axles 64 is translated into angular motion by links 77 which are pivoted at the ends of the cylinder rod and to spindle arms 78 connected to the axle spindles 65. It is important to note, as depicted in FIG. 11, that the links 77 are short enough to lie within the steering linkage is a compact assembly that produces a high degree of articulation of the wheels, as shown in the full-lock left turn position (FIG. 10), either right or left, because of the geometry of the links and spindle arms, with the actuator, moving in straight line fashion next to the front axle bars. More precisely, the steered wheel spindles or axles point toward the rear drive wheel on the inside of a turn so that their axes intersect preferably at or near the hub which minimizes wheel scuffing. This geometry has a range proportional to the wheel base (c) and width (d) of the track lying within a horizontal rectangle bisected by the center of rotation of the inside rear drive wheel. The intersecting point need not be exactly on the axis of the rear axle, as pictured in FIG. 10, and may actually vary in the longitudinal direction (Y) of the rectangle by 25% of the wheelbase length and in a lateral direction (X) by 20% of the wheelbase length defining a turning zone bounded by X, Y within which the intersecting points of the front axle spindles may lie and still minimize the scuffing of the drive wheels 14; however, optimally the intersecting point should lie as near to the end of the axle of the wheel on the inside of the turn as possible. Obviously, in a right-hand turn, the relationship depicted in FIG. 10 is reversed, in which case the right rear wheel is the inside turning wheel for a right-hand turn. To achieve the full articulation depicted in FIG. 10, the stroke of the cylinder rod 70 (FIG. 11) would need to travel the distance (a), in either direction from an neutral position of axial length (b) of the cylinder rod from pivot to pivot point of the links, and with the axles angled 7 degrees inward (FIG. 12), the space (e) is smaller between the ends of the links pivoted to theopposite ends of the actuator. The spindle arms angled outward toward the inside of the wheel rims, describing an arc from the straight-ahead position to full-lock position of about 106 degrees in a full turn, where the distance (b) is 21.7 inches, and the distance (a) is 2.38 inches, (e) is only 1.48 inches and the spindle arms are 2.75 inches long. This produces a geometry where the intersection of a line projected from the front axle spindles will be at, or near, the rear axle ends as depicted in FIG. 10 for the optimum condition of minimal wheel scrubbing and traction control.

Figure 13:
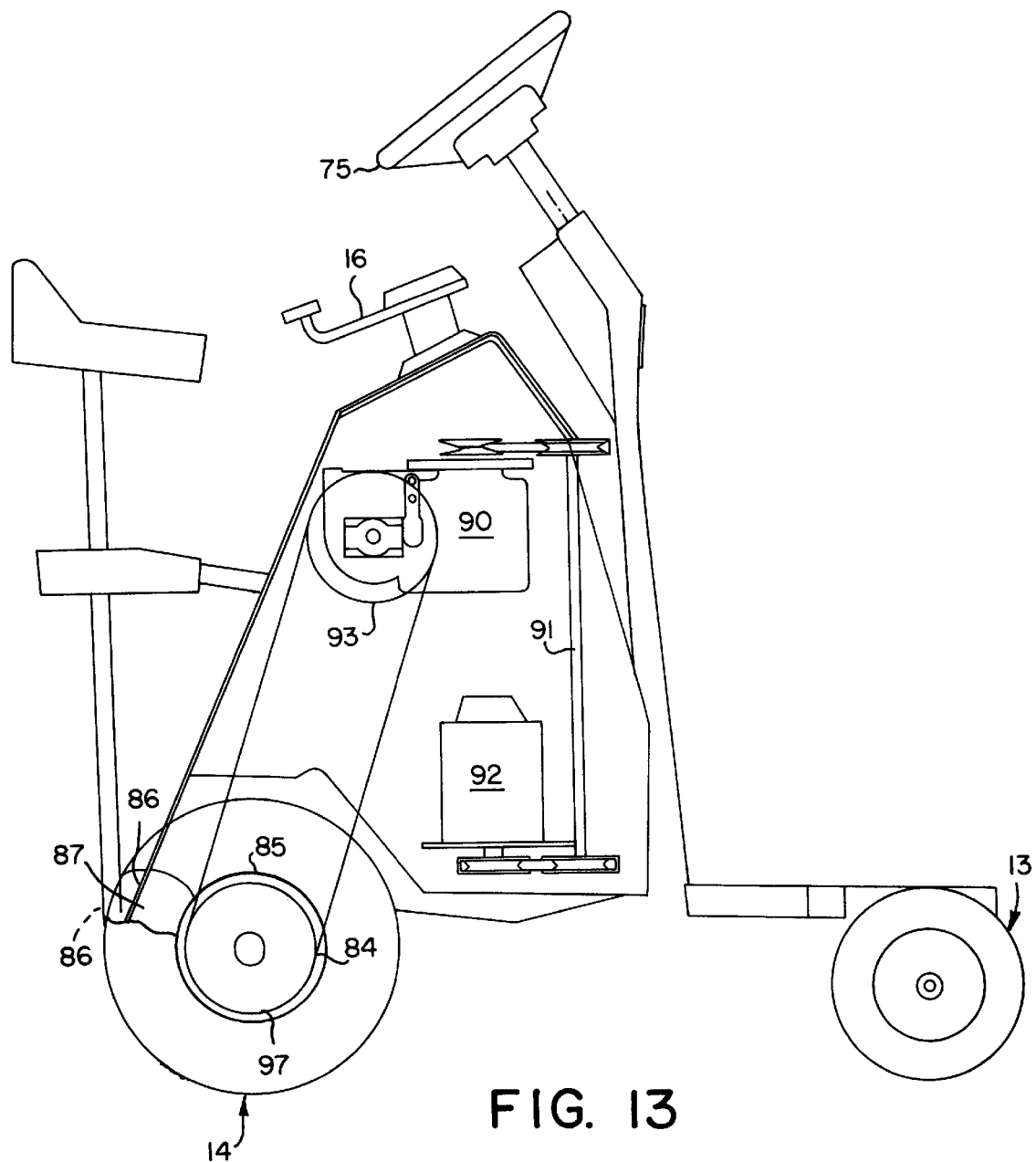
FIG. 13 is a side elevational view showing the transmission mounting above the engine and portions of the drive line including the chain drives from the sprocket ends of the transaxle down to the sprockets on the drive wheels.
Figure 14:
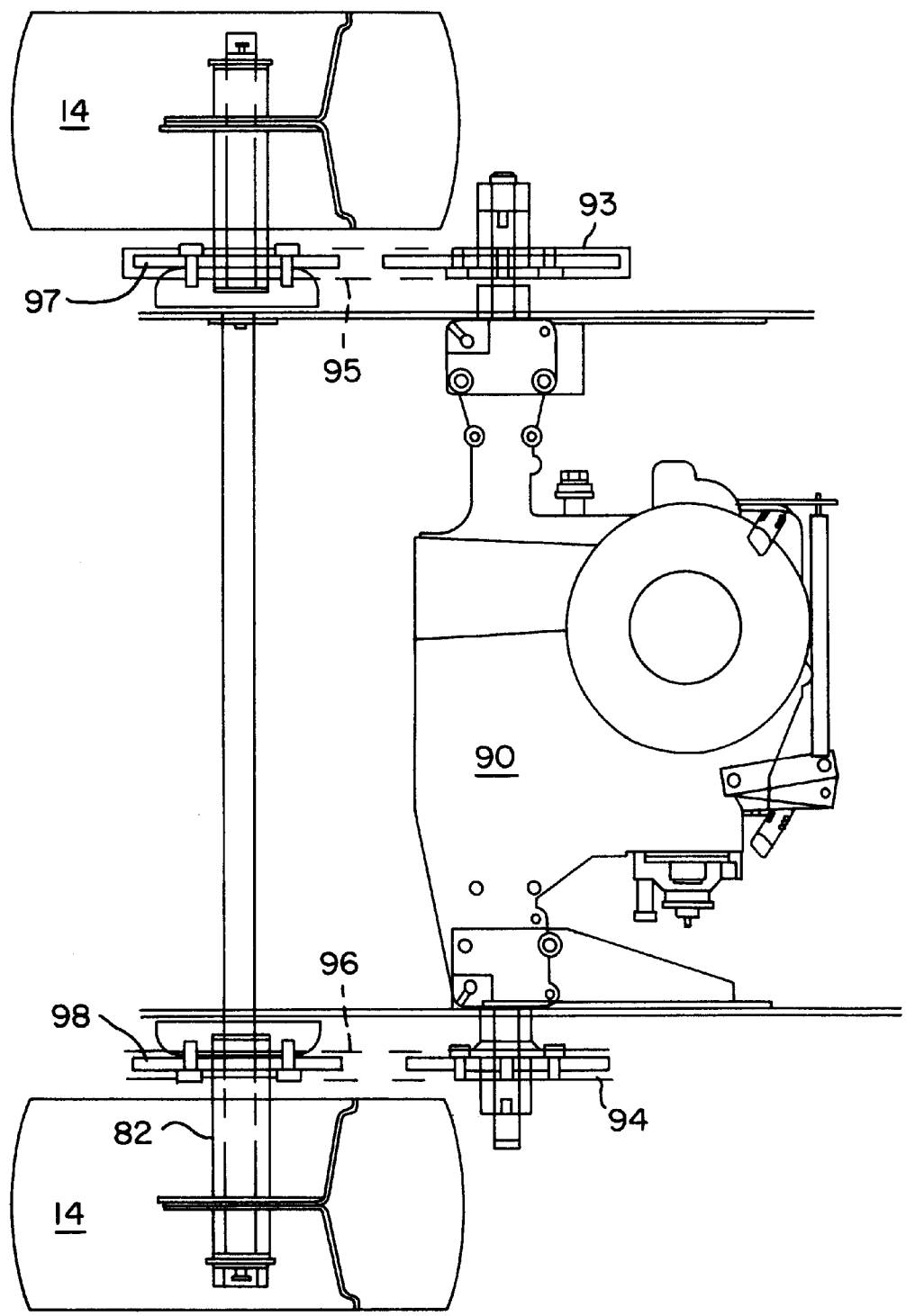
FIG. 14 is a partial top view of the trans-axle showing the oppositely extending drive sprockets to which the drive chains depicted in FIG. 13 are attach and extend down to drive the sprockets on the drive wheels as shown.

With respect to the transmission and drive line, reference is made to FIGS. 11, 13 and FIG. 14, where a rear axle 80 mounted on the frame 60 and rotatably supports wheel shafts 82 in carrying wheel hubs 83 on which the wheels 14 are mounted. Each wheel hub 83 has a brake drum 84, which is encircled by a brake band 85 fixed at one end and wrapping around the drum 84 making pivotal connection with a link 86 which is manually operated by foot control (not shove) from the operator station independently on each side of the machine such that the drive wheel on one side can be braked while the drive wheel on the other side continues to receive power from the transmission. When the brake pedal is depressed, the lever 86 moves to the dotted line position, and because of the relationship of the pivot point 87 of the lever and the connection with the end of the brake band, it causes the band to tighten on the drum 84, and in the released position, as shown in full line in FIG. 13 the lever 86 relaxes the brake band freeing the wheel for rotation.

It is important to note that the transmission 90 is situated above the engine 92 which transmits torque through a jack shaft 93 by means of a belt and pulley arrangement to power the transmission 90, which in the preferred embodiment is a hydrostatic transaxle (FIG. 14) with opposed output shafts on which sprockets 93, 94 are mounted. Drive chains 95, 96 descend from the sprockets 93, 94 to drive sprockets 97, 98 fixed on the wheel hubs for independently powering the drive wheels 14 in either forward or reverse direction and at variable speed. The transaxel 90 is a commercial hydrostatic unit having a swash plate, which in the neutral position, imparts no torque to the output shafts to drive pulleys 93, 94; however, when the control lever (not shown) is pushed in the forward direction by the operator, the swash plate causes the hydrostatic system to produce forward torque rotation while moving the swash plate in the opposite direction from neutral produces reverse drive torque rotation. A differential gearing in the housing of the trans-axle allows slippage of either sprocket 93, 94 depending on from which wheel the maximum resistance to rotation is as sensed. The trans-axle is made by the Tecumseh Products Co. in Salem, Ind., and is a Model No. VST 205. The seventeen horsepower engine output is at about 3500 rpm, which in the configuration shown, will produce a ground speed of approximately 7 miles per hour at full bias of the swash plate.

Accordingly, while the invention has been described in detail with respect to a mulching mower, it will be appreciate that the utility tractor can be used with other attachments where the maneuverability in tight quarters is critical to the operation of the attachments and while various components have been illustrated with respect to carrying out the functions of the tractor it will be appreciated that other mechanical equivalents may be used without departing from the scope of the invention as set forth in the appended claims.

I claim:

1. A self-propelled utility tractor comprising a frame having a front and rear providing an operator's station, a steering wheel accessible from the operator's station, a pair of drive wheels rotatably supported on the frame, one on each side, for propelling the tractor in forward or reverse directions, and at variable speeds, a pair of steerable wheels, steerable axles rotatable supporting a steerable wheel on the frame, one on each side, spaced longitudinally from the drive wheels, the axles mounted for articulation from a straight-ahead position to a full-lock right or left turning position, and a steering linkage mounted on the frame connected to the steerable axles and to the steering wheel for articulation of the steerable wheels relative to the frame, the geometry of which is such that the axes of each steerable axle intersect in a turning zone bounded longitudinally by 25 percent, and laterally by 20 percent, of the wheelbase length, bisected by the drive wheel axis of rotation on the inside of a turn whereby scuffing is minimized of the drive wheels in maximum turn conditions.

2. A self-propelled utility tractor as set forth in claim 1 wherein the steerable wheels are near the front, and the drive wheels near the repair of the frame, and the operator's station is between the drive wheels to minimize the necessity of having to lean into a sharp turn.

3. A self-propelled utility tractor as set forth in claim 2 wherein the steerable axles supporting the steerable wheels are mounted on a pair of axle bars pivoted to the frame to allow independent oscillation of the steerable wheels.

4. A self-propelled utility tractor as set forth in claim 2 in which the steering linkage includes an actuator having rectilinear motion, either right or left, transversely of the frame adjacent the axle bars and parallel to them operated by the steering wheel, a pair of links one at each end of the actuator, and a pair of arms fixed to the steerable axles connected to the opposite ends of the links for rotating the steerable wheels, the dimensions being such that at full stroke of the actuator, right or left, the axes of the steerable wheels intersect near the center of rotation of the drive wheel on the inside of a turn.

5. A compact, self-propelled utility tractor comprising a frame supported on a pair of steerable wheels adjacent the front and a pair of driven wheels adjacent the rear, the longitudinal distance between the axes of rotation of the steerable and driven wheels defining a wheelbase, the lateral spacing of the wheels on opposite sides of the frame defining the track width, an operator's station for a standing operator approximately mid-way between track width, a steering wheel accessible from the operator's station, steering system supported on the frame including a steering linkage operated by the steering wheel, said steering linkage being connected to the front wheels which are capable of articulation about a steering radius, independent wheel brakes associated with each drive wheel accessible from the operator's station for independently braking rotation of the drive wheel on the inside of a turn while the other continues under power to assist in making the turn, the wheel base equal to but not substantially greater than the track width, and the steering linkage being capable of articulating the front wheels at maximum turn so as to cause the steering radius to be substantially near the wheel on the inside of the turn of the tractor for maximum maneuverability and for working in tight quarters.

6. A compact, self-propelled utility tractor as set forth in claim 5 wherein spindle shafts rotatably support the front steerable wheels, an axle bar, one for each steerable wheel, mounting the spindle shafts, a pivot location on the centerline of the frame for each axle bar allotinng independent oscillations of the spindle shafts and front wheels, spindle arms fixed to each spindle shaft extending forwardly, a pair of links having outer and inner ends, one pivotally attached to each spindle arm on the outer end and the inner end extending inwardly toward the associated axle bar, an actuator in front of the axle bars capable of rectilinear motion closely parallel to the axle bars pivotally attached to the inner ends of the links whereby rectilinear motion of the actuator is translated into angular motion at the steerable wheels by the links and spindle arms, such that at full tun of the steering wheel, the actuator is stroked either right or left to cause the links and spindle arms to travel in an arc which is amplified by the geometry of the links and arms, whereby the axes of the spindle axles intersect near the axle end of the drive wheel on the inside of a full turn.

7. A compact, self-propelled utility tractor as set forth in claim 5 wherein a mower deck is underslung beneath the frame between the front and rear wheels adapting the tractor for mowing, the mower deck having a discharge chute, a baffle housing mounted on the frame adapted to receive the cuttings from the discharge chute, baffles in the housing defining longitudinally curved paths for receiving the discharged cuttings from the mower deck and distributing them uniformly across the back to avoid wind rowing.

8. A compact, self-propelled utility tractor as set forth in claim 7 wherein the mower deck has three rotary cutting blades, one rotating counter to the other two, a belt and pulley drive, means connecting the belt and pulley drive to the cutting blades and to the source of power of the tractor to drive the blades at cutting speeds for cutting grass, ducts around each blade for confining the air flow in a circular path and discharging it out the rear of the deck, and a baffle housing mounted on the frame of the tractor extending from the discharge opening from the deck between the rear drive wheels for distributing the clippings uniformly behind the tractor.

9. A compact, self-propelled utility tractor as set forth in claim 5 wherein the frame supports an engine having an output shaft extending down toward the lower part of the frame, a transmission above the engine having an input shaft extending upwardly toward the upper part of the frame, a jack shaft, and flexible drive elements connecting the output shaft from the engine to the input of the transmission, a pair of output shafts on opposite sides of the transmission selectively capable of being driven from neutral in either forward or reverse directions, a differential in the transmission, and a pair of flexible drive elements extending downwardly, one from each output shaft of the transmission, for powering the respective drive wheel on that side of the tractor at either forward or reverse speeds.

\* \* \* \* \*